US010910662B2

(12) United States Patent
Atienza

(10) Patent No.: US 10,910,662 B2
(45) Date of Patent: Feb. 2, 2021

(54) STRUCTURED ANODE FOR A SOLID OXIDE FUEL CELL

(71) Applicant: Nissan North America, Inc., Franklin, TN (US)

(72) Inventor: Dianne Atienza, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 418 days.

(21) Appl. No.: 15/716,222

(22) Filed: Sep. 26, 2017

(65) Prior Publication Data

US 2019/0097249 A1 Mar. 28, 2019

(51) Int. Cl.
| | |
|---|---|
| *H01M 8/0252* | (2016.01) |
| *H01M 8/1213* | (2016.01) |
| *H01M 4/86* | (2006.01) |
| *H01M 8/1246* | (2016.01) |
| *H01M 4/90* | (2006.01) |

(Continued)

(52) U.S. Cl.
CPC ....... *H01M 8/1213* (2013.01); *H01M 4/8621* (2013.01); *H01M 4/8626* (2013.01); *H01M 4/8652* (2013.01); *H01M 4/9066* (2013.01); *H01M 8/021* (2013.01); *H01M 8/0252* (2013.01); *H01M 8/1246* (2013.01); *H01M 2004/8684* (2013.01); *H01M 2008/1293* (2013.01)

(58) Field of Classification Search
None
See application file for complete search history.

(56) References Cited

U.S. PATENT DOCUMENTS

| 6,589,680 B1 * | 7/2003 | Gorte ................. H01M 4/8885 429/482 |
| 7,842,200 B2 | 11/2010 | Ehrman et al. |
| 10,550,462 B1 * | 2/2020 | Wessels ............... F01D 25/005 |

(Continued)

OTHER PUBLICATIONS

McIntosh, S., et al., Effect of Precious-Metal Dopants on SOFC Anodes for Direct Utilization of Hydrocarbons, Electrochemical and Solid-State Letters, 2003, pp. A240-A243, vol. 6 (11), Electrochemical Society.

(Continued)

*Primary Examiner* — Haixia Zhang
(74) *Attorney, Agent, or Firm* — Young Basile Hanlon & MacFarlane, P.C.

(57) ABSTRACT

Implementations of a solid oxide fuel cell (SOFC) include a current collector, an electrolyte layer, and an anode. The electrolyte layer may be a solid electrolyte layer. The anode may include one or more micro-pathways that extend between the current collector and the electrolyte layer. The micro-pathways may be constructed of yttria stabilized zirconia (YSZ). Each micro-pathway is in contact with the electrolyte layer and provides a direct pathway between the electrolyte layer and the current collector. The direct pathway created by the micro-pathways may be the shortest distance between the electrolyte layer and the current collector. Each of the one or more micro-pathways may be coated with electrocatalyst nanoparticles. A barrier material may be disposed between each micro-pathway and the current collector to prevent contact between the current collector and the electrocatalyst nanoparticles.

11 Claims, 8 Drawing Sheets

(51) Int. Cl.
*H01M 8/021* (2016.01)
*H01M 8/124* (2016.01)

(56) References Cited

U.S. PATENT DOCUMENTS

| | | |
|---|---|---|
| 2004/0028994 A1 | 2/2004 | Akikusa et al. |
| 2010/0028757 A1* | 2/2010 | Fu .................... H01M 4/8621 429/440 |
| 2010/0038012 A1 | 2/2010 | Tucker et al. |
| 2011/0053041 A1* | 3/2011 | Tucker .................... C22C 29/12 429/486 |

OTHER PUBLICATIONS

Resini, C., et al., Yttria-stabilized zirconia (YSZ) supported Ni—Co alloys (precursor of SOFC anodes) as catalysts for the steam reforming of ethanol, International Journal of Hydrogen Energy, 2008, pp. 3728-3735, vol. 33, Elsevier.

Kun Joong Kim, et al., Y0.08Sr0.88TiO3—CeO2 composite as a diffusion barrier layer for stainless-steel supported solid oxide fuel cell, Journal of Power Sources, 2016, pp. 385-390, vol. 307, Elsevier.

Brandner, Marco, et al., Electrically Conductive Diffusion barrier layers for Metal-Supported SOFC, Science Direct, 2008, pp. 1501-1504, vol. 179, Elsevier.

D.D. Hass, et al., Multi-scale pore morphology in directed vapor deposited yttria-stabilized zirconia coatings, Materials Science and Engineering A, 2010, pp. 6270-6282, vol. 527, Elsevier.

Liu, Zhangbo, et al., Fabrication and modification of solid oxide fuel cell anodes via wet impregnation/infiltration technique, Journal of Power Sources, 2013, pp. 243-259, vol. 237, Elsevier.

Besra, Laxmidhar, et al., Electrophoretic Deposition of YSZ Particles on Non-Conducting Porous NiO—YSZ Substrates for Solid Oxide Fuel Cell Applications, J. Am. Ceram. Soc., 2006, pp. 3003-3009, vol. 89 (10).

Toshio Suzuki, et al., Impact of Anode Microstructure on Solid Oxide Fuel Cells, Science, Aug. 14, 2009, pp. 852-855, vol. 325.

G. Schiller, Progress in Metal-Supported Solid Oxide Fuel Cells, International Symposium on Energy Materials: Opportunities and Challenges, Mar. 1-2, 2011, Kolkata, India.

Tucker, Michael C., et al., Performance of metal-supported SOFCs with infiltrated electrodes, Journal of Power Sources, 2007, pp. 477-482, vol. 171, Elsevier.

Tucker, Michael C., Progress in metal-supported solid oxide fuel cells: A review, Journal of Power Sources, 2010, pp. 4570-4582, vol. 195, Elsevier.

Woochul Jung, et al., Robust nanostructures with exceptionally high electrochemical reaction activity for high temperature fuel cell electrodes, Energy Environ. Sci., 2014, pp. 1685-1692, vol. 7.

T. Tatte, et al., Yttria stabilized zirconia microtubes for microfluidics under extreme conditions, RSC Adv., 2014, pp. 17413-17419, vol. 4.

* cited by examiner

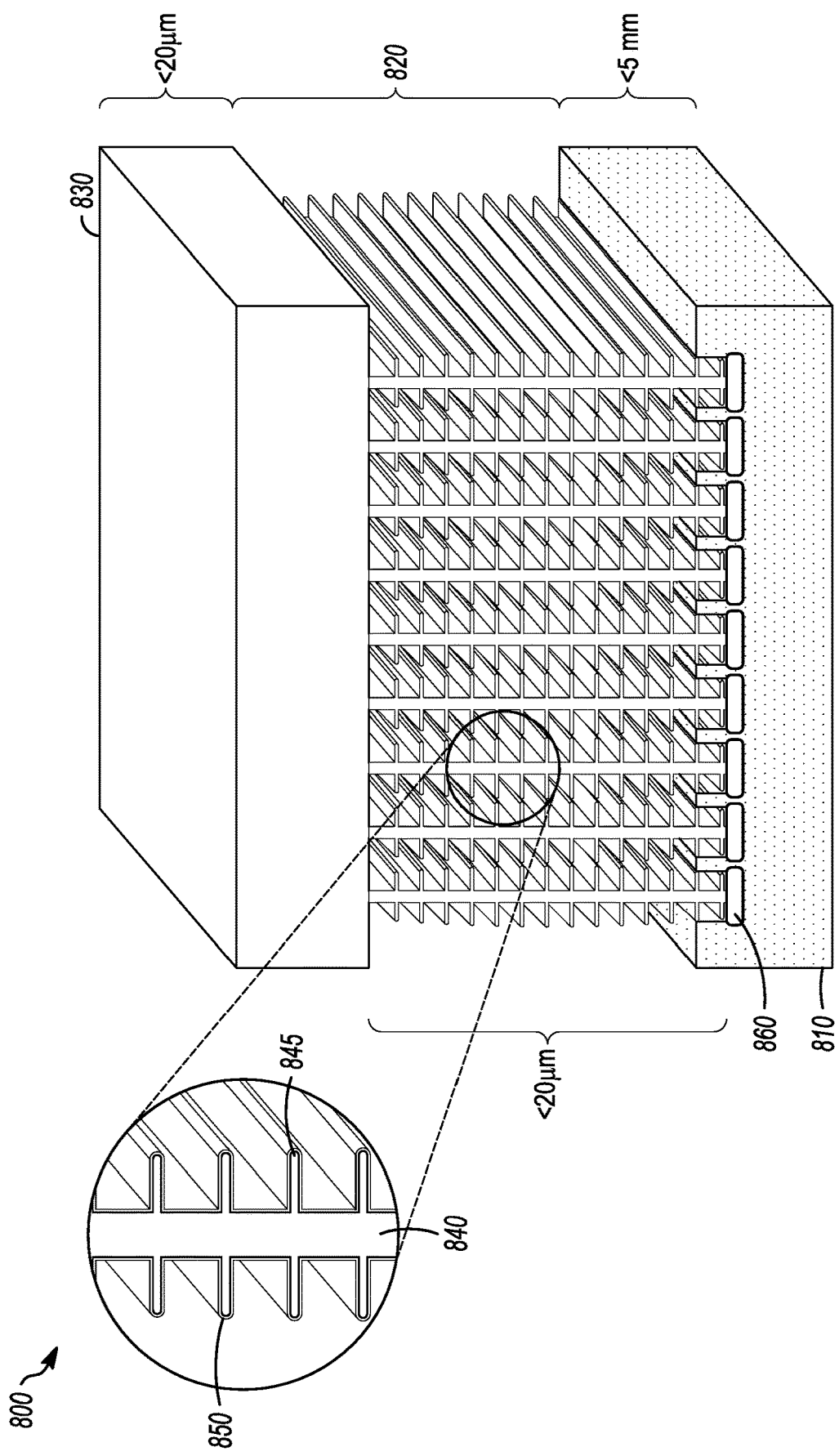

STRUCTURED ANODE FOR A SOLID OXIDE FUEL CELL

TECHNICAL FIELD

This disclosure relates to a structured anode for a solid oxide fuel cell.

BACKGROUND

Solid oxide fuel cells (SOFCs) allow for conversion of electrochemical fuel to electricity with negligible pollution. Among fuel cells under development, the SOFCs operate at temperatures ranging from 600° C. to 1000° C. Because the SOFCs operate at such high temperature, the materials used as components are thermally challenged.

SUMMARY

Disclosed herein are implementations of a solid oxide fuel cell (SOFC). The SOFC may include a current collector, an electrolyte layer, and an anode. The electrolyte layer may be a solid electrolyte layer. The SOFC may use various mixtures of hydrogen and/or hydrocarbon containing fuels. A reaction site, an oxygen ion conducting material, and an electron conducting material in the anode structure make up a three-phase boundary in the SOFC where oxidation occurs. The oxygen ion conducting material may be yttria stabilized zirconia (YSZ) and the electron conducting material may be a catalyst such as nickel. In the examples disclosed herein, the three-phase boundary is increased by increasing the surface area of the anode structure.

In a first example, the anode may include one or more micro-pathways that extend between the current collector and the electrolyte layer. The micro-pathways may be constructed of YSZ. The micro-pathways may be uniformly or non-uniformly distributed in the anode. Each micro-pathway is in contact with the electrolyte layer and provides a direct pathway between the electrolyte layer and the current collector. The direct pathway created by the micro-pathways may be the shortest distance between the electrolyte layer and the current collector. Each of the one or more micro-pathways may be coated with electrocatalyst nanoparticles. A barrier material may be disposed between each micro-pathway and the current collector to prevent contact between the current collector and the electrocatalyst nanoparticles.

In a second example, the SOFC may include an anode that includes one or more columns of YSZ that extend between the current collector and the electrolyte layer. The columns may be uniformly or non-uniformly distributed in the anode. Each of the YSZ columns may be in contact with the electrolyte layer. To increase the surface area of the columns, each column may include branches of YSZ extending from the exterior surface of the columns. In some examples, bimetallic nanoparticles may be deposited onto each of the branches of the YSZ columns. A barrier may be provided between each YSZ column and the current collector to prevent interdiffusion of the active electrocatalyst and the current collector. The barrier material may include copper and/or cerium oxide.

In a third example, the SOFC may include an anode that includes one or more scaffolds in the form of a lattice or a mesh. The scaffold may be constructed of YSZ and extend between the current collector and the electrolyte layer. The scaffold may be in contact with the electrolyte layer and provide one or more direct pathways between the current collector and the electrolyte layer. In some examples, bimetallic nanoparticles may be deposited onto the scaffold. A barrier may be provided between the scaffold and the current collector to prevent interdiffusion of the active electrocatalyst and the current collector, while increasing the gas distribution through the lattice structure. The barrier material may include copper and/or cerium oxide.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 8 is a diagram of an SOFC showing an anode in an example parallel vertical wall configuration.

DETAILED DESCRIPTION

Typical SOFCs are prone to inefficiency due to impurity formation and reduced electronic and ionic transport. Poisoning due to contaminates such as sulfur in the fuel gas can occur. In addition, the anode layer of typical SOFC are known to react with the current collector causing resistance and instability. The anode structures and the SOFCs that use them enhance ionic and electronic conduction, improve poisoning tolerance and increase gas transport surface area, improving the overall power density of the SOFCs.

Figure 1:
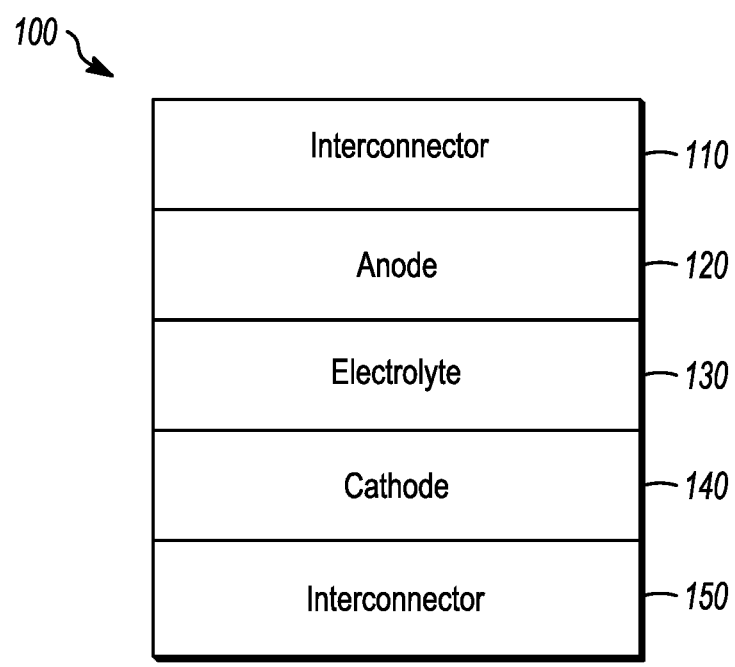
FIG. 1 is a diagram of an example solid oxide fuel cell (SOFC).

FIG. 1 is a diagram of an example SOFC stack 100. The SOFC stack 100 includes an interconnector 110, an anode 120, an electrolyte 130, a cathode 140, and an interconnector 150.

Interconnector 110 may be a bipolar plate. Interconnector 110 may also be referred to as a current collector and may be a metallic or a ceramic layer that is disposed on the anode 120. Some examples of a ceramic interconnector composition may include lanthanum chromite and/or yttrium chromite. Suitable dopants for the ceramic interconnector composition may include nickel, cobalt, vanadium, calcium, strontium, magnesium, copper, manganese, and titanium. Some examples of a metallic interconnector composition may include chromia-based alloys, ferritic stainless steel, stainless steel, and iron/nickel-based super alloys.

The interconnector 110 is used to connect two or more SOFCs in series to combine the electricity that each SOFC generates. Because the interconnector 110 is exposed to both the oxidizing and reducing side of the SOFC at high temperatures, it must be constructed from an extremely stable material.

The anode 120 should exhibit catalytic properties and possess high porosity for the mass transport of reactant and product gases. The anodes disclosed herein have a columnar or scaffold-like structure formed of a nickel-based cermet, although a ceria-based anode or a titanium-based anode are also contemplated. One example of a nickel-based cermet includes yttria-stabilized zirconia (YSZ) and is referred to as Ni/YSZ. Alternative anode cermet compositions may include a samaria-doped ceria (SDC), for example Ni/SDC or may include a gadolinium-doped ceria (GDC), for example Ni/GDC. Additional anode compositions may include a nickel-based catalyst containing mixtures of cobalt and/or dopants of precious metals such as palladium, rhodium, and/or platinum. The columnar or scaffold-like structure provides pathways of YSZ from the current collector 110 to the electrolyte 130, improving ionic transport through the cell. The YSZ scaffold is coated with Ni, providing electron transport. The columnar or scaffold-like structure increases the surface areas for gas transport and the improved ionic and electronic conduction in the anode, decreasing the overpotentials associated with the adsorption/diffusion charge transfer step in the oxidation reaction. Improving the ionic and electronic conduction in the anode will also result in a reduction in cell operating temperature. Reducing the operating temperature will increase the redox and thermal stability and reliability of the anode.

Electrolyte 130 is a dense electrolyte that is sandwiched between the anode 120 and the cathode 140. The electrolyte 130 is an oxide conducting electrolyte that possesses a fluorite structure or perovskite structure.

Cathode 140 is an air electrode that allows diffusion of gaseous oxygen towards the cathode/electrolyte interface. Cathode 140 compositions may include perovskite materials, for example, lanthanum strontium manganite (LSM)-based perovskites. Other example cathode 140 compositions may include Sr-doped lanthanum ferrite (LSF) materials and Sr-doped lanthanum ferro-cobaltite (LSCF) materials.

Interconnector 150 may be a bipolar plate. Interconnector 150 may also be referred to as a current collector and may be a metallic or a ceramic layer that is disposed on the cathode 140. Some examples of a ceramic interconnector composition may include lanthanum chromite and/or yttrium chromite. Suitable dopants for the ceramic interconnector composition may include nickel, cobalt, vanadium, calcium, strontium, magnesium, copper, manganese, and titanium. Some examples of a metallic interconnector composition may include chromia-based alloys, ferritic stainless steel, stainless steel, and iron/nickel-based super alloys.

The interconnector 150 is used to connect two or more SOFCs in series to combine the electricity that each SOFC generates. Because the interconnector 150 is exposed to both the oxidizing and reducing side of the SOFC at high temperatures, it must be constructed from an extremely stable material.

Figure 2:
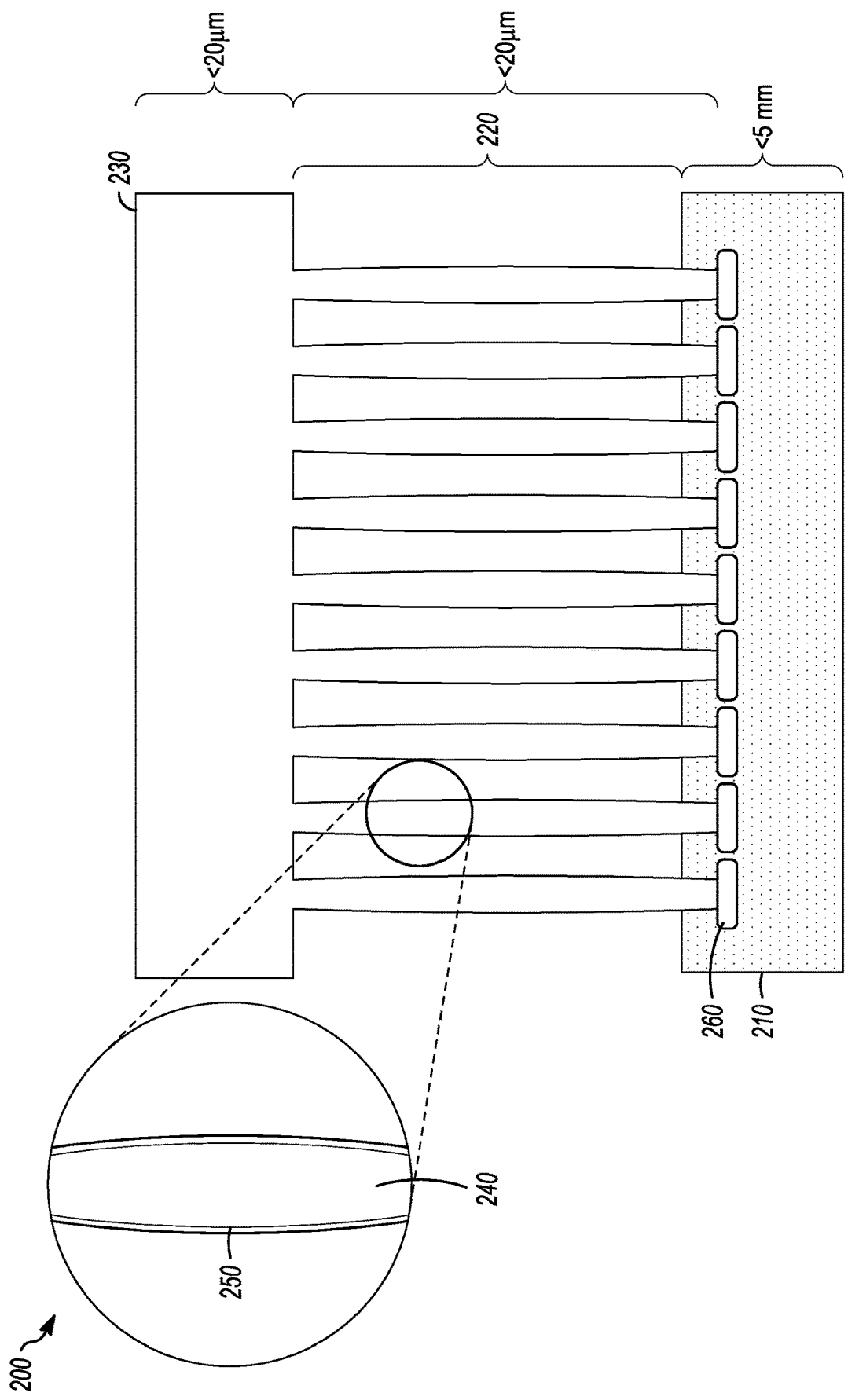
FIG. 2 is a diagram of an SOFC showing an example micro-pathway structure of an anode.

FIG. 2 is a diagram of an SOFC 200 showing an anode 220 disclosed herein having a micro-pathway structure. As shown in FIG. 2, the SOFC 200 includes a current collector 210, an anode 220, and a solid electrolyte layer 230. The current collector may be a ferritic steel or any other suitable material. The anode 220 may have a porosity that is greater than or equal to 30% and less than or equal to 40%. The anode 220 includes micro-pathways 240 that each extend between the current collector 210 and the solid electrolyte layer 230.

The one or more micro-pathways 240 may be uniformly or non-uniformly distributed in the anode 220 and are used to increase the surface area of the anode 220. Each of the micro-pathways 240 is in contact with the solid electrolyte layer 230 and provides a direct pathway between the solid electrolyte layer 230 and the current collector 210. The direct pathway created by the micro-pathways 240 may be the shortest distance between the solid electrolyte layer 230 and the current collector 210. In this example, the micro-pathways 240 are a YSZ composition and coated with electrocatalyst nanoparticles 250. The micro-pathways 240 of YSZ are merely provided as an example, and it is understood that the micro-pathways 240 may be constructed of any suitable material. The micro-pathways 240 may be extruded microtubes each having an outer diameter of greater than or equal to 10 microns and less than or equal to 100 microns and a wall thickness of greater than or equal to 5 microns and less than or equal to 50 microns. A barrier material 260 is disposed between each micro-pathway 240 and the current collector 210 preventing contact between the current collector 210 and the electrocatalyst nanoparticles 250. The barrier material 260 may include copper and/or cerium oxide. Additional examples of barrier material 260 include oxides of chromium, manganese, gadolinium, strontium, and/or titanium. The barrier material 260 may also function a gas distribution layer and may be formed as a lattice or mesh.

The micro-pathways 240 may be solid columns having a diameter of less than or equal to 10 microns. The micro-pathways 240 may be of any geometrical shape and not limited to a cylindrical geometry depicted in FIG. 2.

Figure 3:
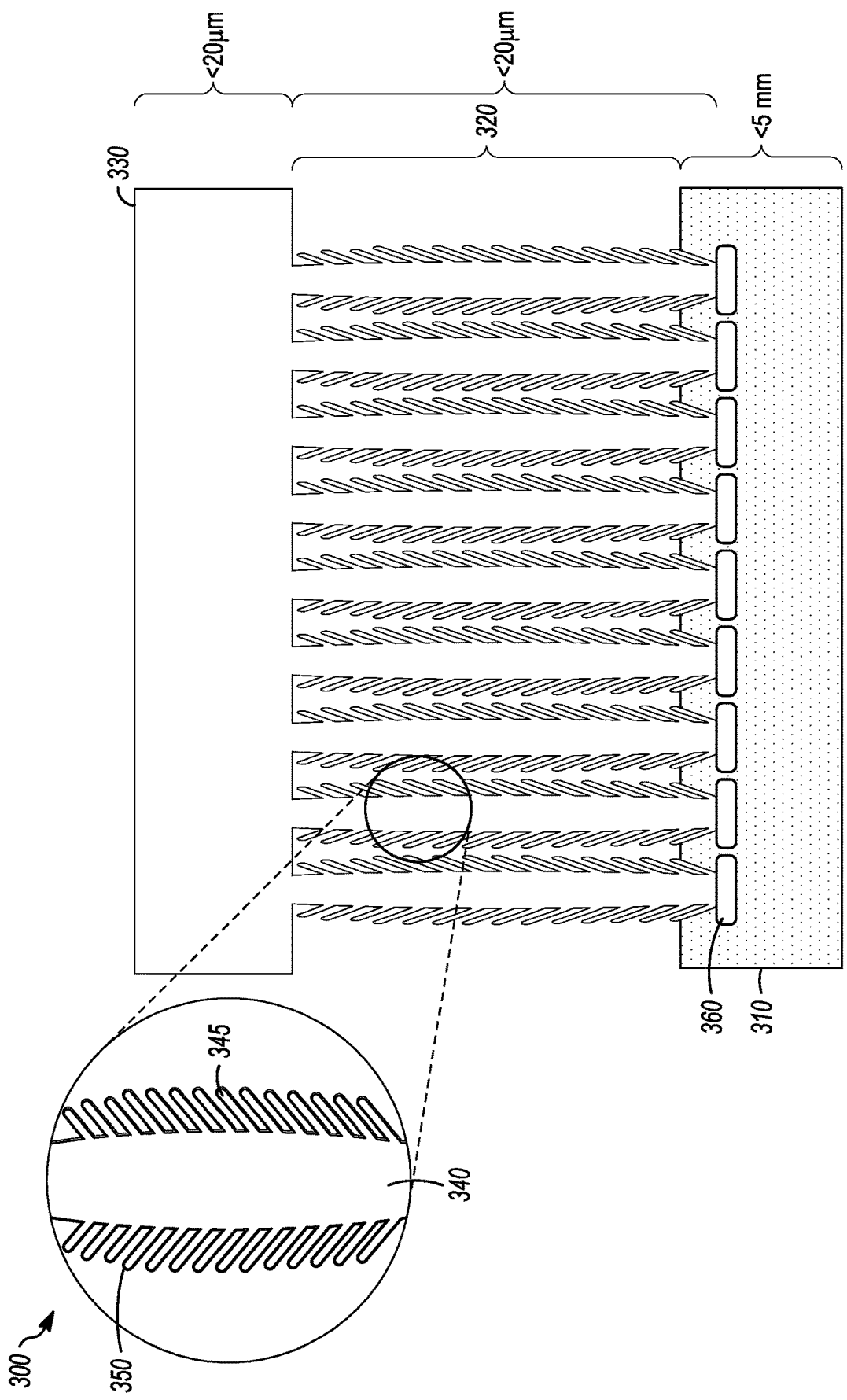
FIG. 3 is a diagram of an SOFC showing an example columnar structure of an anode.

FIG. 3 is a diagram of an SOFC 300 showing an example columnar structure of an anode. As shown in FIG. 3, the SOFC 300 includes a current collector 310, an anode 320, and a solid electrolyte layer 330. The current collector 310 may be a ferritic steel current collector. In this example, the anode 320 is made up of columns 340 of YSZ that extend from the solid electrolyte layer 330 to the current collector 310. The columns 340 of YSZ are merely provided as an example, and it is understood that the columns 340 may be constructed of any suitable material.

The one or more columns 340 may be uniformly or non-uniformly distributed in the anode 320 and are used to increase the surface area of the anode 320. Each of the columns 340 is in contact with the solid electrolyte layer 330 and provides a direct pathway between the solid electrolyte layer 330 and the current collector 310. The direct pathway created by the columns 340 may be the shortest distance between the solid electrolyte layer 330 and the current collector 310. The columns 340 may be of any geometrical shape and not limited to a cylindrical geometry. The surface of each of the columns 340 include branches or nanofilaments 345 to increase the surface area of the columns 340. Each of the branches 345 may be less than or equal to 1 micron in length and have a diameter of less than or equal to 100 nm. The surface of each of the columns 340, including the branches 345, are coated with greater than 3 atomic layers of bimetallic nanoparticles 350 of any suitable material, for example nickel and/or palladium. The branches 345 may be included in any of the embodiments disclosed herein. The anode 320 includes a barrier 360 that is disposed between each column 340 and the current collector 310. The barrier 360 may include copper and/or cerium oxide.

The barrier 360 includes contact points at each of the columns 340 of the anode 320. The barrier 360 may be positioned only between the columns 340 and the current collector 310 or may cover a slightly larger area than the contact area of the columns 340. The barrier 360 may be any suitable material that prevents the resistance and instability caused by the reaction of nickel and ferritic steel at the interface of the current collector 310 and the anode 320. Example materials for the barrier 360 include copper, cerium oxide, and/or YSZ. The barrier 360 may also function as a gas distribution layer formed as a lattice or mesh. The barrier 360 is disposed directly between the anode 320 and the current collector 310, and may be coated with greater than 3 atomic layers of bimetallic nanoparticles on exposed surfaces.

FIG. 8 is a diagram of an SOFC 800 showing an example parallel vertical wall structure of an anode. As shown in FIG. 8, the SOFC 800 includes a current collector 810, an anode 820, and a solid electrolyte layer 830. The current collector 810 may be a ferritic steel current collector. In this example, the anode 820 is made up of parallel vertical walls 840 of YSZ that extend from the solid electrolyte layer 830 to the current collector 810. The parallel vertical walls 840 of YSZ are merely provided as an example, and it is understood that the parallel vertical walls 840 may be constructed of any suitable material.

The one or more parallel vertical walls 840 may be uniformly or non-uniformly distributed in the anode 320 and are used to increase the surface area of the anode 320. Each of the parallel vertical walls 840 is in contact with the solid electrolyte layer 830 and provides a direct pathway between the solid electrolyte layer 830 and the current collector 810. The direct pathway created by the parallel vertical walls 840 may be the shortest distance between the solid electrolyte layer 830 and the current collector 810. The surface of each of the parallel vertical walls 840 include substantially parallel horizontal branches or nanofilaments 845 that extend the length of the parallel vertical walls 840 to increase the surface area of the parallel vertical walls 840. Each of the branches 845 may be less than or equal to 1 micron in length and have a diameter of less than or equal to 100 nm. The surface of each of the parallel vertical walls 840, including the branches 845, are coated with greater than 3 atomic layers of bimetallic nanoparticles 850 of any suitable material, for example nickel and/or palladium. The branches 845 may be included in any of the embodiments disclosed herein. The anode 820 includes a barrier 860 that is disposed between each column 840 and the current collector 810. The barrier 860 may include copper and/or cerium oxide.

The barrier 860 includes contact points at each of the columns 840 of the anode 820. The barrier 860 may be positioned only between the parallel vertical walls 840 and the current collector 810 or may cover a slightly larger area than the contact area of the parallel vertical walls 840. The barrier 860 may be any suitable material that prevents the resistance and instability caused by the reaction of nickel and ferritic steel at the interface of the current collector 810 and the anode 820. Example materials for the barrier 860 include copper, cerium oxide, and/or YSZ. The barrier 860 may also function as a gas distribution layer formed as a lattice or mesh. The barrier 860 is disposed directly between the anode 820 and the current collector 810, and may be coated with greater than 3 atomic layers of bimetallic nanoparticles on exposed surfaces.

Figure 4:
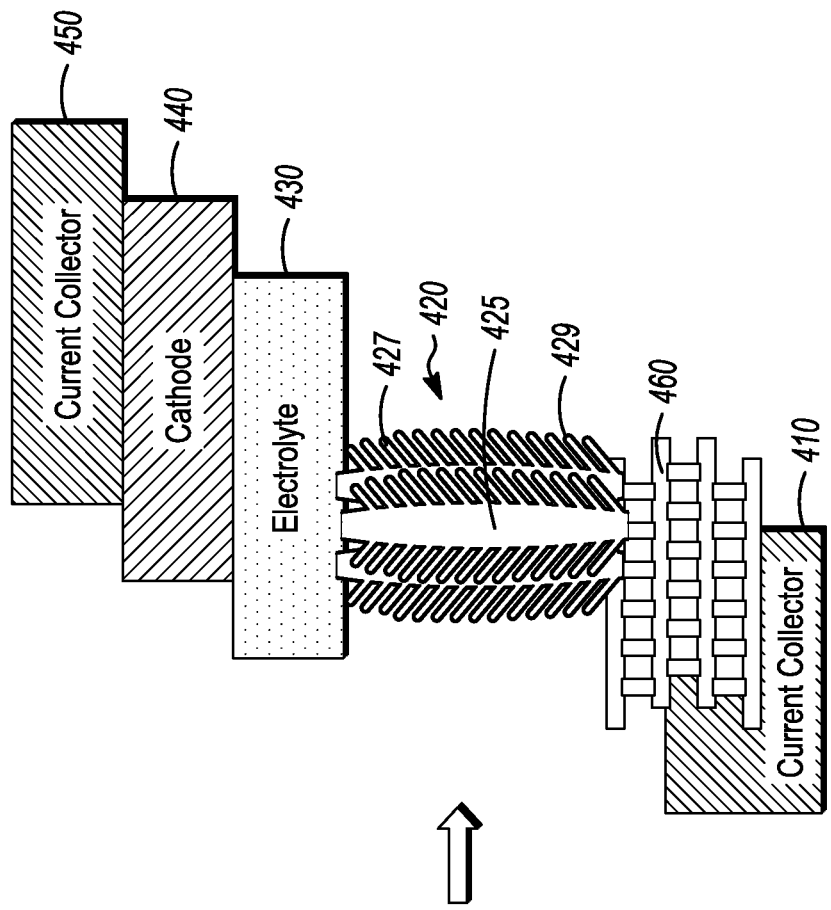
FIG. 4 is a side view and an isometric view of an SOFC in showing an example columnar structure of an anode.
Figure 4:
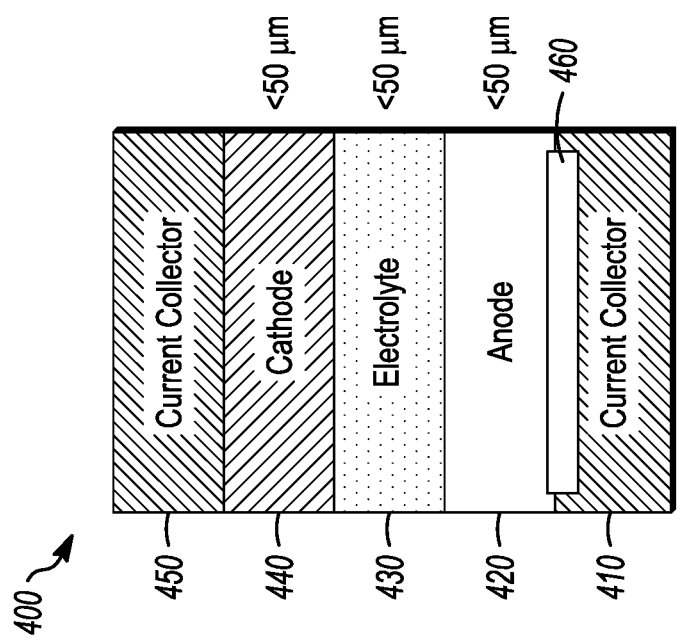

FIG. 4 is a side view and an isometric view of an SOFC 400 showing an example columnar structure of an anode. As shown in FIG. 4, the SOFC 400 includes a current collector 410, an anode 420, a solid electrolyte layer 430, a cathode 440, and a current collector 450. The current collectors 410 and 450 may be ferritic steel current collectors. In this example, the anode 420 may be made up of columns 425 of YSZ that extend from the solid electrolyte layer 430 to the current collector 410. The columns 425 of YSZ are merely provided as an example, and it is understood that the columns 425 may be constructed of any suitable material.

The one or more columns 425 may be uniformly or non-uniformly distributed in the anode 420 and are used to increase the surface area of the anode 420. Each of the columns 425 is in contact with the solid electrolyte layer 430 and provides a direct pathway between the solid electrolyte layer 430 and the current collector 410. The direct pathway created by the columns 440 may be the shortest distance between the solid electrolyte layer 430 and the current collector 410. The columns 425 may be of any geometrical shape and not limited to a cylindrical geometry. The surface of each of the columns 425 includes branches or nanofilaments 427 to increase the surface area of the columns 425. The surface of each of the columns 425, including the branches 427, are coated with greater than 3 atomic layers of bimetallic nanoparticles 429 of any suitable material, for example nickel and/or palladium. The anode 420 includes a barrier 460 that is disposed between each column 425 and the current collector 410. The barrier 460 may include copper and/or cerium oxide.

The barrier 460 includes contact points at each of the columns 425 of the anode 420. The barrier 460 may be any suitable material that prevents the resistance and instability caused by the reaction of nickel and ferritic steel at the interface of the current collector 410 and the anode 420. Example materials for the barrier 460 include copper, cerium oxide, and/or YSZ. The barrier 460 may also function as a gas distribution layer formed as a lattice or mesh. The barrier 460 is disposed directly between the anode 420 and the current collector 410, and may be coated with greater than 3 atomic layers of bimetallic nanoparticles on exposed surfaces.

Figure 5:
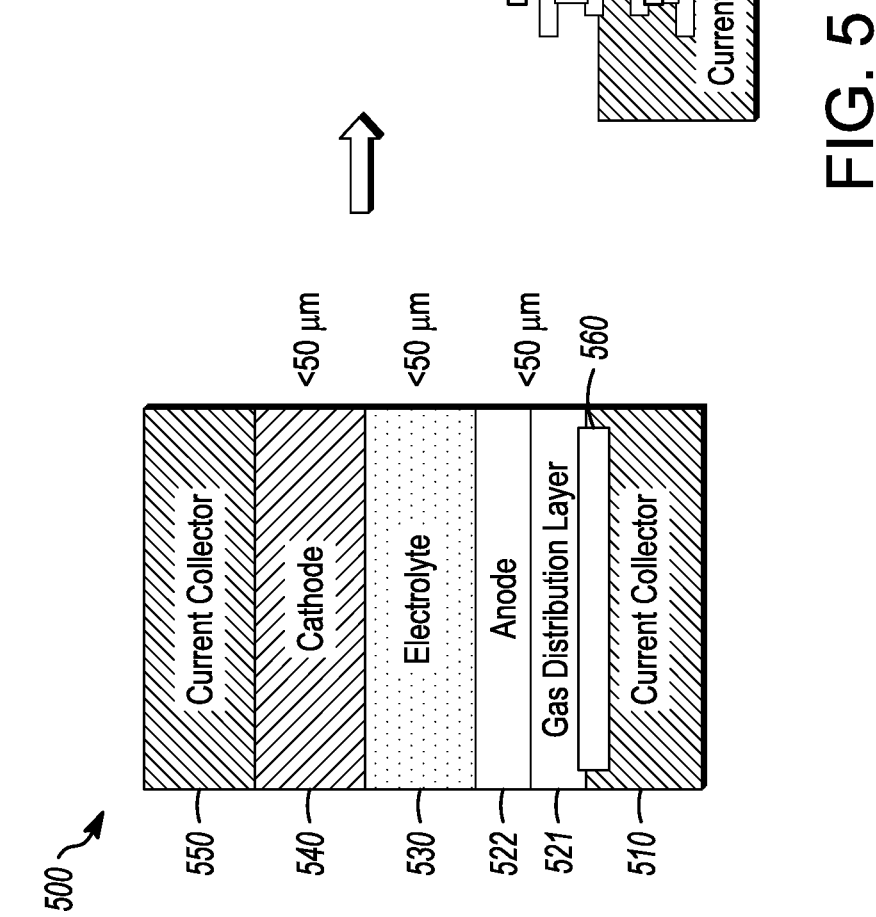
FIG. 5 is a side view and an isometric view of an SOFC showing another example columnar structure of an anode.

FIG. 5 is a side view and an isometric view of an example SOFC 500 showing another example columnar structure of an anode. As shown in FIG. 5, the SOFC 500 includes a current collector 510, a gas distribution layer 521, an anode 522, a solid electrolyte layer 530, a cathode 540, and a current collector 550. The current collectors 510 and 550 may be ferritic steel current collectors. In this example, the anode 522 is made up of columns 525 of YSZ that extend from the solid electrolyte layer 530 to the current collector 510. The columns 525 of YSZ are merely provided as an example, and it is understood that the columns 525 may be constructed of any suitable material. The gas distribution layer 521 is part of the anode 522 and disposed between the columns 525 and the current collector 510.

The one or more columns 525 may be uniformly or non-uniformly distributed in the anode 522 and are used to increase the surface area of the anode 522. Each of the columns 525 is in contact with the solid electrolyte layer 530 and provides a direct pathway between the solid electrolyte layer 530 and the current collector 510. The direct pathway created by the columns 540 may be the shortest distance between the solid electrolyte layer 530 and the current collector 510. The columns 525 may be of any geometrical shape and not limited to a cylindrical geometry. The surface of each of the columns 525 may include branches or nanofilaments 527 to increase the surface area of the columns 525. The surface of each of the columns 525, including the branches 527, are coated with greater than 3 atomic layers of bimetallic nanoparticles 529 of any suitable material, for example nickel and/or palladium. The anode 522 includes a barrier 560 that is disposed between each column 525 and the current collector 510. The barrier 560 may include copper and/or cerium oxide.

The barrier 560 includes contact points at each of the columns 525 of the anode 522. The barrier 560 may be any suitable material that prevents the resistance and instability caused by the reaction of nickel and ferritic steel at the interface of the current collector 510 and the anode 522.

Example materials for the barrier 560 include copper, cerium oxide, and/or YSZ. The barrier 560 may also function as a gas distribution layer formed as a lattice. The barrier 560 may be disposed directly between the gas distribution layer 521 and the current collector 510, and the YSZ may be coated with greater than 3 atomic layers of bimetallic nanoparticles on exposed surfaces.

The gas distribution layer 521 may be a lattice or mesh formed of YSZ, whereby the barrier material 560 is disposed directly between the gas distribution layer 521 and the current collector 510. The lattice or mesh structure of the gas distribution layer 521 may be coated with electrocatalyst nanoparticles, for example greater than 3 atomic layers of bimetallic nanoparticles 529, on the exposed surfaces. The bimetallic nanoparticles 529 may include nickel and/or palladium. The gas distribution layer 521 may act to enhance gas diffusion, thereby increasing electrical and ionic conductivity adjacent to the barrier 560. The gas distribution layer 521 may be included in any of the embodiments disclosed herein.

Figure 6:
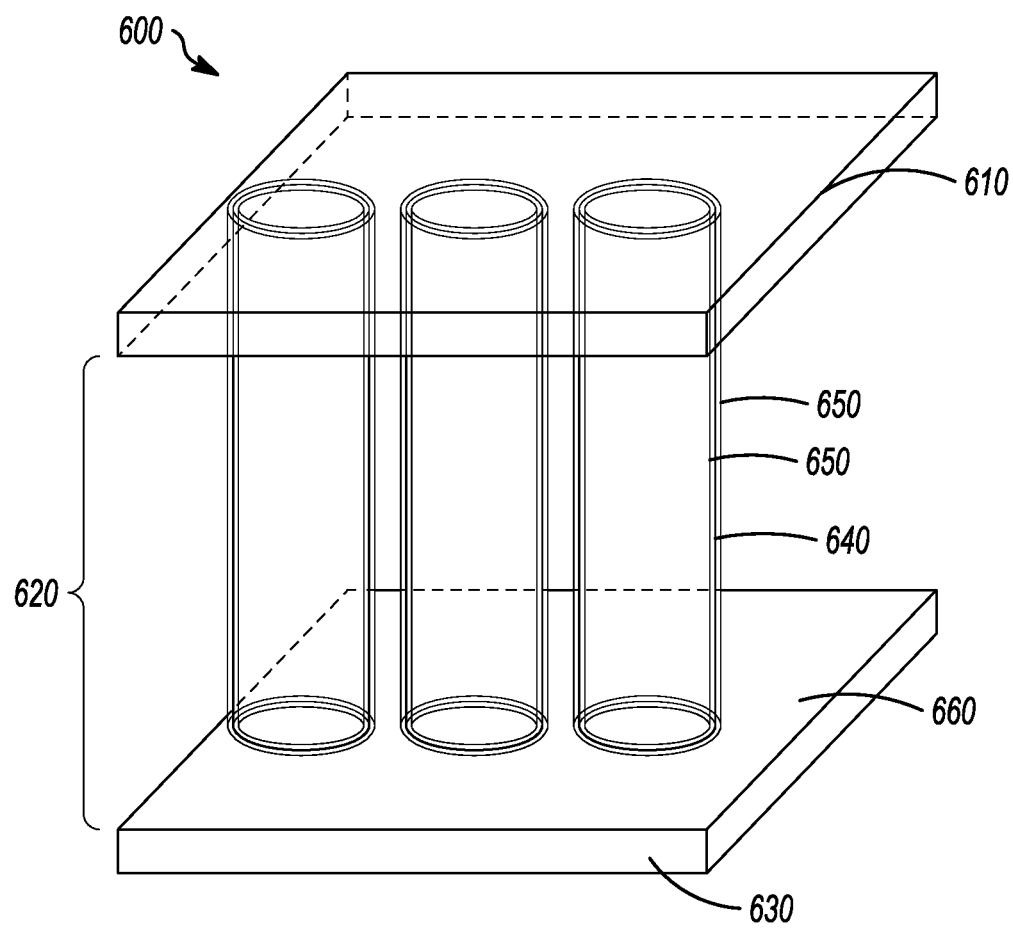
FIG. 6 is a diagram of an SOFC showing an anode in an example tubular configuration.

FIG. 6 is a diagram of an SOFC 600 showing an anode in an example tubular configuration. As shown in FIG. 6, the SOFC 600 includes an electrolyte layer 610, an anode 620, and a metal support layer 630. The electrolyte layer 610 may be of any suitable material, for example it may be a YSZ dense electrolyte layer. The metal support layer 630 may be of any suitable material, for example a ferritic metal material. The anode 620 includes tubes 640 extending from the metal support layer 630 to the electrolyte layer 610. The tubes 640 are constructed of a YSZ electrolyte and are hollow to allow the passage of fuel. Although shown in cylindrical configuration, the tubes 640 may be of any geometrical shape. The tubes 640 are be coated with an optimized metal 650 such as palladium, copper, and/or ceria. The optimized metal 650 may be a continuous thin film of greater than 3 atomic layers. In this example, nickel may be used as an anode catalyst. The tubular configuration may be used with any of the embodiments disclosed herein.

The one or more tubes 640 may be uniformly or non-uniformly distributed in the anode 620 and are used to increase the surface area of the anode 620. Each of the tubes 640 is in contact with the electrolyte layer 610 and provides a direct pathway between the electrolyte layer 610 and the metal support layer 630. The direct pathway created by the tubes 640 may be the shortest distance between the electrolyte layer 610 and the metal support layer 630.

Figure 7:
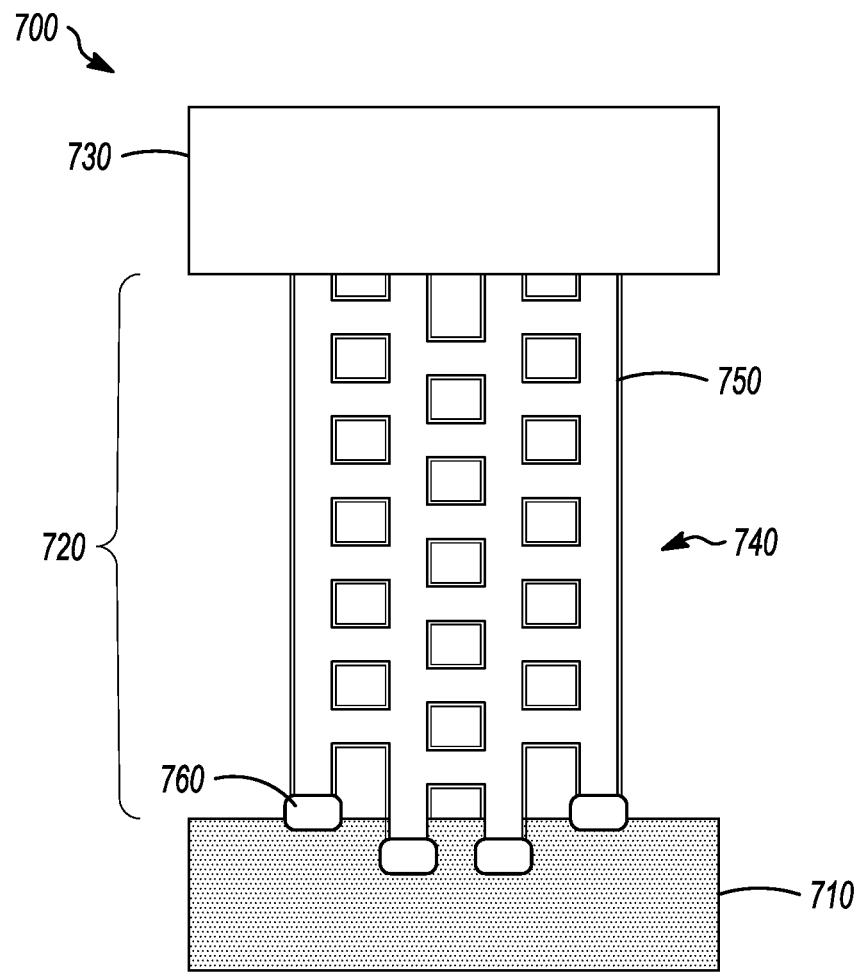
FIG. 7 is a diagram of an SOFC showing an anode in an example scaffold configuration.

FIG. 7 is a diagram of an SOFC showing an anode in an example scaffold configuration. The structure of the scaffold is not meant to be limiting and may include any structure that increases the surface area of the anode. Other scaffold structures are contemplated, so long as the structure includes the pathways between the current collector and the electrolyte. Referring to FIG. 7, the SOFC 700 includes a current collector 710, and anode 720, and a solid electrolyte layer 730. The current collector 710 may be a ferritic metal current collector. The anode 720 is configured as one or more scaffolds 740 of YSZ that extend between the current collector 710 and the solid electrolyte layer 730 and in contact with the solid electrolyte layer 730. The scaffold 740 may be of any suitable material and provides direct pathways between the current collector 710 and the solid electrolyte layer 730. The direct pathway created by the scaffold 740 may be the shortest distance between the solid electrolyte layer 730 and the current collector 710. Greater than 3 atomic layers of bimetallic nanoparticles 750 are deposited onto the scaffold 740. The bimetallic nanoparticles 750 may include nickel and palladium or any other suitable material.

A barrier 760 is provided between the scaffold 740 and the current collector 710. The barrier 760 may include copper and/or cerium oxide. The scaffold configuration may be used with any of the embodiments disclosed herein.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A solid oxide fuel cell, comprising:
    a current collector of ferritic steel;
    a solid electrolyte layer;
    an anode comprising:
        columns of yttria stabilized zirconia (YSZ) extending between the current collector and the solid electrolyte layer and in contact with the solid electrolyte layer;
        branches of YSZ extending from the columns and providing increased surface area, wherein the branches have a diameter of less than or equal to 100 nm;
        bimetallic nanoparticles deposited onto the branches of the YSZ; and
        a barrier provided between each column and the current collector, the barrier comprising copper and cerium oxide.

2. The solid oxide fuel cell of claim 1, wherein the bimetallic nanoparticles comprise nickel and palladium.

3. The solid oxide fuel cell of claim 1, wherein the anode further comprises a gas distribution layer between the columns and the current collector.

4. The solid oxide fuel cell of claim 3, wherein the gas distribution layer is a lattice formed of YSZ, the barrier directly between the gas distribution layer and the current collector, the YSZ coated with bimetallic nanoparticles on exposed surfaces.

5. The solid oxide fuel cell of claim 1, wherein the barrier is also a gas distribution layer formed as a lattice.

6. The solid oxide fuel cell of claim 1, wherein the branches are less than or equal to 1 micron in length.

7. A solid oxide fuel cell, comprising:
    a current collector of ferritic steel;
    a solid electrolyte layer;
    an anode comprising:
        columns of yttria stabilized zirconia (YSZ) extending between the current collector and the solid electrolyte layer and in contact with the solid electrolyte layer;
        branches of YSZ extending from the columns and providing increased surface area, wherein the branches are less than or equal to 1 micron in length;
        bimetallic nanoparticles deposited onto the branches of the YSZ; and
        a barrier provided between each column and the current collector, the barrier comprising copper and cerium oxide.

8. The solid oxide fuel cell of claim 1, wherein the bimetallic nanoparticles are deposited onto the branches in atomic layers, the layers numbering greater than three.

9. The solid oxide fuel cell of claim 1, wherein the barrier is positioned only between the columns and the current collector.

10. The solid oxide fuel cell of claim 1, wherein the barrier is coated with greater than three atomic layers of additional bimetallic nanoparticles on exposed surfaces of the barrier.

11. The solid oxide fuel cell of claim 7, wherein the branches have a diameter of less than or equal to 100 nm.

* * * * *